July 28, 1925.

J. C. LEWIS 1,547,427

DISK TYPE VEHICLE WHEEL

Filed March 28, 1924

Inventor
James C. Lewis,
by his attorney,
Charles N. Gooding.

Patented July 28, 1925.

1,547,427

UNITED STATES PATENT OFFICE.

JAMES C. LEWIS, OF PORTLAND, MAINE.

DISK-TYPE VEHICLE WHEEL.

Application filed March 23, 1924. Serial No. 702,572.

*To all whom it may concern:*

Be it known that I, JAMES C. LEWIS, a citizen of the United States, residing at Portland, in the county of Cumberland and State of Maine, have invented new and useful Improvements in Disk-Type Vehicle Wheels, of which the following is a specification.

This invention relates to disk type vehicle wheels and particularly to wheels of the type adapted for use upon motor vehicles.

The object of the invention is to provide a disk type vehicle wheel having a permanent circumferential rim preferably formed integral therewith and constructed to receive a demountable rim, the latter encircling the permanent rim and contacting therewith in a manner to permit of its being easily and quickly applied thereto, or removed therefrom, said permanent rim and said demountable rim each being provided with similarly formed shouldered portions extending therearound and adapted to abut closely together, and said permanent rim being provided with an annular groove formed therein in which a split locking ring is mounted, the latter being provided for the purpose of clamping the demountable rim upon the permanent rim of the disc wheel with the shouldered portions of each rim closely engaging each other.

The invention consists in the combination and arrangement of parts set forth in the following specification and particularly pointed out in the claim thereof.

Referring to the drawings.

Like numerals refer to like parts throughout the several views of the drawings.

Figure 1:
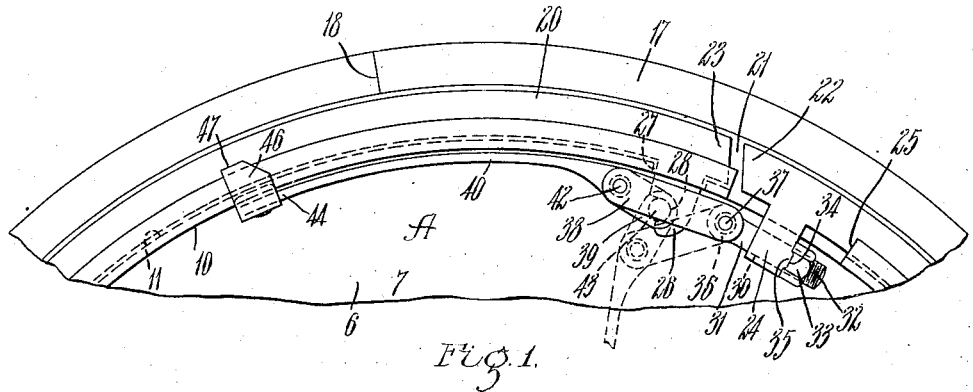
Figure 1 is a front elevation of a portion of a disk type vehicle wheel embodying my invention, the demountable rim being illustrated clamped in position upon the permanent rim.

In the drawings, A represents a vehicle wheel embodying therein a hub portion 5 of any suitable construction to which is rigidly secured in any suitable manner a web portion or disk 6. The disk 6 is constructed of any suitable sheet metal, the body portion 7 thereof being pressed into any desired form in order that the proper degree of strength and flexibility may be obtained. The disk 6 is provided with an outwardly extending circumferential flange 8, preferably formed integral therewith, and constituting a permanent rim for the vehicle wheel A. The permanent rim 8 has a shouldered portion 9 located at a point intermediate its width and extending entirely therearound, while the outer portion of said rim is bent at 10 to form an annular groove 11 which also extends entirely therearound.

Figure 2:
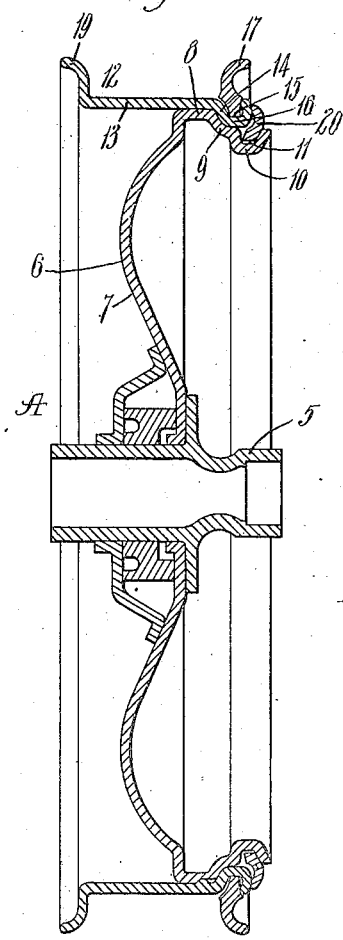
Fig. 2 is a central section through a vehicle wheel embodying my invention.
Figure 3:
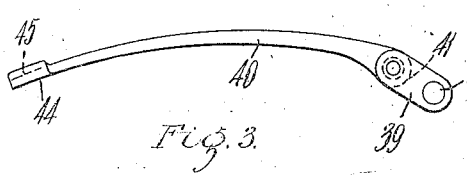
Fig. 3 is a detail side elevation of the locking lever for the split ring.

Mounted upon the permanent rim 8 is a demountable rim 12, preferably of a type for holding a quick detachable straight side form of pneumatic tire, although said demountable rim may be of the clincher type if it is so desired. The demountable rim 12 embodies therein a centrally disposed cylindrical portion 13 which encircles the permanent rim 8 and contacts with the extreme outer portion thereof. The portion 13 of the demountable rim 12 at one side thereof is provided with a shouldered portion 14 which extends entirely therearound, said shouldered portion being formed similar to the shouldered portion of the permanent rim 8, and when said demountable rim 12 is located in position upon the permanent rim 8, as illustrated in Fig. 2, the shoulder 14 abuts closely against the shoulder 9.

Located upon the demountable rim 12 adjacent to the shouldered portion 14 thereof is an annular groove 15, said groove being formed by bending said rim at 16. The groove 15 extends entirely around the demountable rim 12 at one side thereof and is provided for the purpose of receiving a detachable flange 17, the latter being split at 18, see Fig. 1, to permit its removal from said groove when the tire is removed from the demountable rim. At the other side of the demountable rim 12 a fixed flange 19 is provided which is formed integral with the cylindrical portion 13 of said rim.

The demountable rim 12 is held in position on the permanent rim 8 by a mechanism which is identical in construction with that illustrated and described in a patent issued to me upon December 20, 1921, No. 1,400,828 to which reference may be made for a complete description. Briefly described, however, this mechanism embodies therein a split ring 20, the inner edge of which projects into the annular groove 11 in the permanent rim 8. The ring 20 is split at 21, see Fig. 1, and the adjacent ends 22 and 23 of said split ring are preferably inclined at an angle to the outer and inner edges thereof. The end 22 of the split ring 20 has a lug 24 thereon projecting inwardly from the inner edge thereof and through a slot 25 provided in the grooved portion of the permanent rim 8. The other end 23 of the split ring 20 is also provided with a lug 26 which projects through a hole 27 in the grooved portion of the permanent rim 8. The lug 26 has a notch 28 formed in the rear edge thereof. The lug 24 has a hole 30 extending therethrough through which projects a stud 31 which is screw-threaded at 32 to receive a nut 33. The nut 33 has grooves 34 extending thereacross and adapted to receive projections 35 located on the rear edge of the lug 24. The opposite end of the stud 31 is provided with an eye 36 through which a pivot 37 extends, said pivot 37 being rigidly fastened to the stud 31 and projecting beyond said stud on opposite sides thereof in order that it may receive one end of each of a pair of links 38. The links 38 at their other ends straddle an end 39 of a lever 40, the latter being bifurcated at 41 to receive the lug 26 and said links 38 are pivoted to said lever 40 at 42. The bifurcated end 39 of the lever 40 has a stud 43 rigidly secured therein and provided for the purpose of entering the notch 28 of the lug 26 when the lever 40 is rocked to contract the split ring 20 as hereinafter to be more fully explained. The lever 40 at its free end 44 is channel-shaped at 45 in order that said end may straddle the under side of that portion of the flange of the permanent rim 8 which contains the annular groove 11 and a thin flat spring 46 is secured in any suitable manner to the outer free end 44 of the lever 40 and when said lever is located in its closed or locking position, an upper flange portion 47 of said spring 46 projects over and engages the upper edge of the extreme outer portion of the permanent rim, thus locking said lever in a closed or clamping position.

The general operation of the device hereinbefore specifically described is as follows:—In removing the demountable rim 12 from the permanent rim 8 of the vehicle wheel A, it is simply necessary to loosen the free end 44 of the lever 40 from the position illustrated in full lines in Fig. 1 and move said lever to the position illustrated in dotted lines in said figure. This allows the split ring 20 to expand a sufficient amount to permit said ring to be removed from the groove 11 of the permanent rim. The demountable rim 12 is then easily disengaged from the permanent rim by sliding the former upon the latter toward the right, in Fig. 2.

In attaching the demountable rim 12 to the permanent rim 8, the operation hereinbefore described is reversed and said demountable rim is forced toward the left in Fig. 2 until the shouldered portion 14 of said demountable rim engages the shouldered portion 9 of said permanent rim. The split ring 20 is then inserted in the groove 11 of the permanent rim and with the lever 40 positioned approximately as illustrated in dotted lines in Fig. 1 said lever is manipulated to engage the stud 43 with the notch 28 of the lug 26 and said lever is then moved from said dotted line position to the full line position, and the opposite end portions 22 and 23 of said split ring 20 are forced toward each other, thereby contracting said ring within the annular groove 11 and forcing the shouldered portion 14 of said demountable rim 12 tightly against the shouldered portion 9 of said permanent rim 8.

The construction hereinbefore described is such as to provide a very strong and practical form of disk wheel, together with a demountable rim therefor and said demountable rim may be easily and quickly attached to or removed from the permanent rim of the vehicle wheel and when in position thereon is very securely locked thereto.

I claim:

A disk type vehicle wheel embodying therein a permanent rim having concentric circumferential portions of different diameters extending therearound provided with a circumferential shoulder portion located therebetween, said permanent rim also having an annular groove formed therein, a demountable rim encircling said permanent rim and seated upon each of said concentric circumferential portions and abutting against said shoulder portion, and means located within said annular groove to clamp said demountable rim upon said permanent rim.

In testimony whereof I have hereunto set my hand in the presence of two subscribing witnesses.

JAMES C. LEWIS.

Witnesses:
FRANKLIN E. LOW,
HAZEL F. BATES.